United States Patent [19]

Shaw

[11] Patent Number: 5,367,048
[45] Date of Patent: Nov. 22, 1994

[54] POLYMER ALLOY MATERIAL AND PROCESS FOR PRODUCTION THEREOF

[75] Inventor: William J. D. Shaw, Calgary, Canada

[73] Assignee: University Technologies International Inc., Alberta, Canada

[21] Appl. No.: 901,163

[22] Filed: Jun. 19, 1992

[51] Int. Cl.$^5$ ............................................. C08G 73/00
[52] U.S. Cl. .................................... 528/367; 528/422; 528/502; 528/503; 525/191; 525/232; 525/233; 525/234
[58] Field of Search ............... 525/232, 233, 234, 191; 528/367, 422, 355, 502, 503

[56] References Cited

U.S. PATENT DOCUMENTS

| | | | |
|---|---|---|---|
| 3,591,362 | 7/1971 | Benjamin | 75/0.5 BA |
| 3,728,088 | 4/1973 | Benjamin | 29/182.5 |
| 3,816,080 | 6/1974 | Bomford et al. | 29/182.5 |
| 4,292,079 | 9/1981 | Pickens et al. | 75/232 |
| 4,643,780 | 2/1987 | Gilman et al. | 148/12.7 A |
| 5,004,778 | 4/1991 | Waagen et al. | 264/126 |
| 5,021,523 | 1/1991 | Iizuka et al. | 525/537 |
| 5,180,777 | 1/1993 | Padwa et al. | 525/66 |

OTHER PUBLICATIONS

Calgary-Herald, "This plastic shrugs at nuclear blasts," Wednesday, Apr. 14, 1993, p. A3.

*Primary Examiner*—John Kight, III
*Assistant Examiner*—Duc Truong
*Attorney, Agent, or Firm*—Fitzpatrick, Cella, Harper & Scinto

[57] ABSTRACT

A polymer alloy material is produced by a process including the step of heating a powdered precursor material comprising polymer particles having an average particle size less than about 1000 μm to a temperature less than the melting point of the polymer at a pressure of at least about 5 MPa to produce the polymer alloy material. Preferably the powdered precursor material is produced by mechanically milling a polymer to provide a powdered precursor material having an average particle size in the range of from about 0.5 μm to about 200 μm. The invention is particularly suited for processing a single polymer or a mixture of two or more polymers which are otherwise difficult to process at a temperature less than the melting point of the polymer.

34 Claims, 6 Drawing Sheets

POLYMER ALLOY MATERIAL AND PROCESS FOR PRODUCTION THEREOF

BACKGROUND OF THE INVENTION

1. Field of the Invention

The present invention relates to a polymer alloy material and to process for production thereof. The present invention also relates to a powdered precursor material useful for producing the polymer alloy material and to a process for production thereof.

2. Description of the Prior Art

Mechanical alloying was developed in 1968 by J. S. Benjamin and is described in "Dispersion Strengthened Superalloys by Mechanical Alloying", Metall. Trans, Vol. 1, pg. 2493 (1970), the contents of which are herein incorporated by reference. Initial efforts at mechanical alloying were aimed at producing an alloy combining oxide dispersion strengthening with gamma prime precipitation hardening in a nickel-based superalloy intended for gas turbine applications. Over time, the mechanical alloying process evolved from production of complex oxide dispersion strengthened (ODS) alloys to a process for producing composite metallic powders capable of yielding alloys with controlled, extremely fine microstructures. Accordingly, it is known that the mechanical alloying process may be used to produce metal alloys that are otherwise difficult or impossible to produce utilizing conventional melt techniques.

Generally, mechanical alloying comprises two steps. In the first step, the material to be alloyed is introduced into a high energy ball mill and is ground over a long period of time to produce an extremely fine powder by the mechanism of repeatedly fracturing and cold welding the fine powder particles. Each fine powder particle is comprised of a very uniform mixture of the various elements comprising the alloy. The second step in the process comprises consolidating the fine powder particles below the melting point of the material by using controlled amounts of pressure, time and temperature as described in P. S. Gilman et al. in "Mechanical Alloying", Ann. Rev. Mater. Sci., Vol. 13, pg. 279 (1983), the contents of which are hereby incorporated by reference.

Polymers are materials which have widespread applicability due to their relatively low density, low cost and their ability to be easily shaped for their intended purpose. Conventionally, it has been convenient to process polymeric materials to make them into useful articles by utilizing thermoforming techniques wherein the polymer is heated to a point where it will flow at a reasonable rate under applied stress. Examples of such known thermoforming techniques include extrusion, injection molding and calendering. Unfortunately, these techniques cannot be applied to many polymers having a high melting point since such polymers remain as solids up to the point of degradation (D. M. Bigg, *Polymer Engineering and Science*, 17 (9), pg. 691 (1977)). Additionally, many polymers are physically incompatible when melted and mixed together resulting in phase separation thereof to produce a nonhomogeneous material having nonuniform physical properties. Thus, attempts at alloying polymeric materials have generally been limited to production of polymeric alloys based on using chemical reactions, such as block and graft copolymerization and interpenetrating polymer network techniques as described by L. H. Sperling in "Interpenetrating Polymer Networks and Related Materials", Plenum Press (1981), the contents of which are hereby incorporated by reference.

It would be desirable to have an improved process for producing an alloyed polymeric material comprising at least one polymer which could be applied to a larger variety of polymers.

SUMMARY OF THE INVENTION

It is an object of the present invention to provide a novel polymer alloy material.

It is another object of the present invention to provide a process for producing a polymer alloy material.

It is yet another object of the present invention to provide a novel powdered precursor material useful for producing a polymer alloy material.

It is yet another object of the present invention to provide a process for producing a powdered precursor material useful for producing a polymer alloy material.

Accordingly, in one of its aspects, the present invention provides a polymer alloy material when produced by a process comprising the step of:

heating a powdered precursor material comprising polymer particles having an average particle size less than about 1000 $\mu$m to a temperature less than the melting point of the polymer at a pressure of at least about 5 MPa to produce the polymer alloy material.

In another of its aspects, the present invention provides a process for producing a polymer alloy material comprising the step of:

heating a powdered precursor material comprising polymer particles having an average particle size less than about 1000 $\mu$m to a temperature less than the melting point of the polymer at a pressure of at least about 5 MPa to produce the polymer alloy material.

In yet another of its aspects, the present invention provides a process for producing a polymer alloy material comprising the steps of:

mechanically milling a polymer to provide a powdered precursor material having an average particle size less than about 1000 $\mu$m; and heating the powdered precursor material to a temperature less than the melting point of the polymer at a pressure of at least about 5 MPa to produce the polymer alloy material.

In yet another of its aspects, the present invention provides a powdered precursor material useful for producing a polymer alloy material, the precursor material comprising a polymer having an average particle size less than about 1000 $\mu$m.

Thus, it has been discovered that, by subjecting a polymer to certain process steps, a polymer alloy material may be consolidated at a temperature below the melting point of the polymer. It should be appreciated that the term "polymer alloy material", as used in reference to the present invention, encompasses a material comprising a single polymer or a mixture of two or more polymers. Although the term "alloy" is typically used in reference to a mixture of two or more components, it has been discovered that a single polymer which is otherwise difficult to process using conventional techniques, for example due to degradation during thermoforming, may be suitably processed in accordance with the present invention while minimizing or inhibiting such degradation. Accordingly, the terms "alloy", "alloyed" and "alloying", when used in reference to the present invention, are intended to encompass materials having a single polymer or a mixture of two or more polymers. When a mixture of two or more polymers is used, heating of the powdered precursor material should be conducted at a temperature less than the lowest melting point of the individual polymer components.

It has been discovered that the present polymer alloy material may be made by consolidating a prepared powdered precursor material comprising polymer particles having an average particle size less than about 1000 $\mu$m at temperature less than the melting point of the polymer. In one aspect of the invention, consolidation of the powdered precursor material is preceded by production thereof utilizing a mechanical milling technique. In this aspect of the invention, a mechanically alloyed polymer is produced: this is a surprising and unexpected discovery.

The polymer alloy material of the present invention exhibits superior physical properties when compared to a similar polymeric material made utilizing conventional thermoforming techniques. This is a surprising and unexpected discovery, especially since the polymer alloy is consolidated at a temperature less than the melting point of the polymer therein.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

The present invention is applicable to virtually all polymers which are conventionally processed by, inter alia, the application of heat. Generally, it is preferred to use a polymer which is a thermoset or a thermoplastic. Non-limiting examples of polymers suitable for use herein may be selected from the group comprising polycarbonate, poly(methyl methacrylate), poly(amide-imide), polyacryleneketone, poly(acrylonitrile-butadiene-styrene), polyetheretherketone, poly(phenol-formaldehyde), polyphenol, polyester, polacrylate, polyeryl sulfone, poly(ether-imide), polyether sulfone, poly(ethylene terephthalate), polyacrylonitrile, polyamide, polystyrene, poly(vinyl chloride), poly(vinyl alcohol), polychlorotrifluoroethylene, epoxy, polycyanate, polymethylpentene, poly(vinyl acetate), poly(vinylidene chloride), poly(vinyl fluoride), polychloroprene, poly(vinylidene fluoride), poly(ethylene oxide), polyoxymethylene, polyisoprene, polyisobutylene, polyethylene, polybutadiene and substituted derivatives thereof. The preferred polymer for use herein is polyamide (e.g. nylon 6,6).

The present polymer alloy may be produced by consolidating a powdered precursor material comprising polymer particles having an average particle size less than about 1000 $\mu$m. The manner in which the powder precursor material is produced is not particularly restricted in this aspect of the invention.

Preferably, the powdered precursor material is produced by mechanical milling of a polymer to provide a powdered precursor having an average particle size less than about 1000 $\mu$m, preferably in the range of from about 0.5 $\mu$m to about 200 $\mu$m. More preferably, the powdered precursor has an average particle size in the range of from about 2 $\mu$m to about 50 $\mu$m, even more preferably in the range of from about 2 $\mu$m to about 30 $\mu$m, most preferably in the range of from about 2 $\mu$m to about 10 $\mu$m. The manner by which the polymer is mechanically milled to provide the powdered precursor material is not particularly restricted. It should be appreciated that the term "mechanically milling", as used herein with respect to a polymer, encompasses mechanical working of polymer to effect fracturing thereof. Thus, in this context, "mechanical milling" includes processes such as milling, cutting, crushing and the like.

For example, crushing includes "quick crushing" which comprises freezing the polymer, for example in liquid nitrogen, followed immediately by crushing in a suitable press or similar device. This embodiment is particularly suited to production of the powdered precursor material from recycled plastic feedstock.

Preferably, mechanical milling of the polymer is conducted in a ball mill capable of providing an overall acceleration of at least 10 g's. As is well known in the art, the operating frequency of the ball mill is inversely related to processing time required to achieve a certain average particle size and mechannical intermixing of the individual particles. Examples of suitable ball mills include a high-speed shaker ball mill for small size samples (several grams) and a high energy ball mill comprising a vertical drum with a series of impellers therein which are rotated by a powerful motor thereby agitating steel balls in the drum—see J. S. Benjamin, *supra*, incorporated herein by reference. The following mills are also useful for producing a suitable powdered precursor material: vibrating-shaker mills, horizontal ball or rod mills (adapted to generate high impact conditions) and crusher mills.

It is preferred that the reaction chamber in the ball mill be cooled to a temperature below the glass transition temperature of the polymer being mechanically milled. In the case of a mixture of one or more polymers, it is preferred that the reaction chamber in the ball mill be cooled to a temperature below the lowest glass transition temperature of the individual polymers being mechanically milled. Typically, such cooling may be effected by contacting the outside of the ball mill chamber with liquid nitrogen which serves to lower the temperature in the chamber to below $-150°$ C.

The duration of mechanical milling is not particularly restricted provided that it be sufficient to achieve the desired average particle size of the powdered precursor material and, preferably, to achieve intermixing within individual particles. Generally, the polymer will be processed for a period of time sufficient to provide the necessary average particle size for the powdered precursor material. Typically, the period of time may be at least about 6 hours, preferably from about 6 hours to about 24 hours or longer.

The polymer alloy material is formed by consolidation of the powdered precursor material. Specifically, the powdered precursor material is heated to a temperature less than the melting point of the polymer at a pressure of about 5 MPa to produce the polymer alloy material. The preferred temperature is defined by the range of from about 75° C. less than the melting point of the polymer up the melting point of the polymer, more preferably from about 50° C. less than the melting point of the polymer up the melting point of the polymer, most preferably from about 25° C. less than the melting point of the polymer up the melting point of the polymer. The preferred pressure is at least about 10 MPa, more preferably at least about 30 MPa, most preferably at least about 55 MPa.

The powdered precursor material is subjected to heat and pressure for a period sufficient to effect consolidation thereof. The actual period of time required for consolidation can be easily ascertained by a person skilled in the art and depends on factors such as temperature, type of polymer(s), average particle size of powdered precursor material and the like.

Consolidation may be conducted in a consolidation press which is known to those skilled in the art.

In a preferred embodiment of the consolidation step, the powdered precursor material is pretreated prior to consolidation thereof. This pretreatment step preferably comprises maintaining the powdered precursor material at a temperature in the range of from about 50° to about 100° C. under vacuum for a period of at least about 5 hours, more preferably in the range of from 15 to 25 hours, to degas the powdered precursor material.

The pretreatment step is especially preferred when using a polymer which is reactive to the environment (e.g. moisture, oxygen and the like). Non-limiting examples of such polymers include EPON, cellulose acetate, nylon 6/6, ionomers, cellulose propionate, nylon 6, poly(vinyl butyral), cellulose nitrate, poly(vinyl formate), cellulose acetate butyrate, ethyl cellulose, nylon 11, polyimides, melamine-phenol resin, reelamine-formaldehyde resin, poly(methyl methacrylate), poly(acrylonitrile-butadiene-styrene), polyoxymethylene, nylon 12, poly(aryl ether), polysulfones, polyesters, polycarbonates and substituted derivatives thereof.

Embodiments of the present invention will be described with reference to the following Examples which are not intended to limit the scope of the invention.

EXAMPLE 1

The polymer used in this Example was nylon 6,6, a semi-crystalline polyamide commercially available from E.I. dupont de Nemours & Co.

To produce a polymer alloy material falling within the scope of the present invention, reactor grade polyamide pellets and a mechanically cut polyamide powder precursor material having an average particle size of 200 μm were used. For comparison purposes, the reactor grade polyamide pellets were thermoformed at 285° C. (melting point of material is 260° C.) using conventional techniques to produce a billet for testing purposes. For convenience, the samples discussed in this Example may be identified as follows:

Sample Identification
Mechanically Cut polyamide Polymer Alloy MCPA
Mechanically Milled polyamide Polymer Alloy MMPA
Thermally Processed PolyAmide TPPA The reactor grade polyamide pellets were initially mechanically milled in a shaker ball mill which was operated at an overall acceleration of 12.3 g's at a frequency of 1750 Hz. The ball mill chamber was cooled using liquid nitrogen to provide a temperature below −150° C. which corresponds to about 100° C. below the glass transition temperature of the polyamide. The polyamide pellets were processed for 24 hours at the end of which the mechanically milled powdered precursor material was removed from the ball mill chamber.

Figure 1:
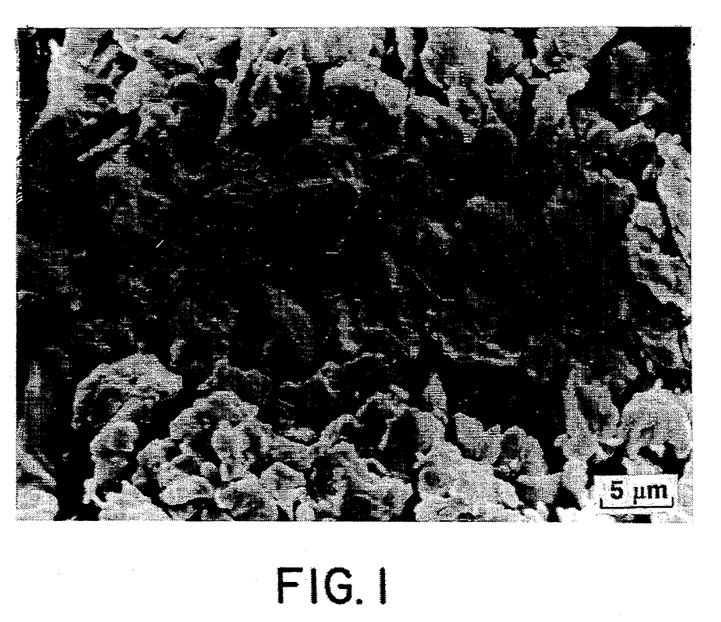
FIG. 1 is an electron micrograph of a mechanically milled powdered precursor (polyamide) material.
Figure 2:
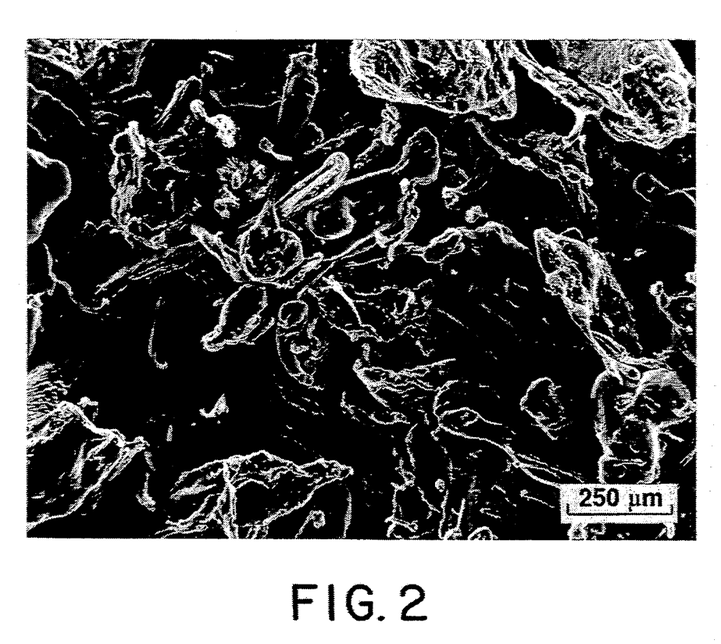
FIG. 2 is an electron micrograph of a mechanically cut powdered precursor (polyamide) material.

Morphology studies of the mechanically milled and mechanically cut powdered precursor materials were conducted, and electron micrographs thereof are provided in FIGS. 1 and 2 respectively.

As illustrated in FIG. 1, the mechanically milled powdered precursor material was found to be comprised of a conglomeration of larger particles being made up of many fine, small-sized particles. The overall average individual particle size was 3 μm. In contrast, as illustrated in FIG. 2, the characteristics of the mechanically cut powdered precursor material were quite different, revealing a particle size around 200 μm and clear boundaries of the particles were apparent. It is believed the conglomeration of particles and very coarse particle shape of the mechanically milled powdered precursor material compared to the sharply defined shape of the mechanically cut powdered precursor material is evidence that the former has been subjected to a significantly higher degree of repeated fracturing and cold welding known to occur in mechanical alloying processes. It should be appreciated that the mechanically cut powdered precursor material has also been subjected to fracturing, albeit to a different type of fracturing than the mechanically milled powdered precursor material.

The mechanically milled powdered precursor material was transferred to a consolidation press where it was maintained at 80° C. under vacuum for 20 hours to degas the material. Thereafter, the temperature was raised to 233° C. and a pressure of 68.95 MPa was applied for a period of 48 hours. At the end of consolidation, a solid billet of MMPA had been formed and was removed from the consolidation press for testing thereof.

The mechanically cut powdered precursor material was consolidated in a similar fashion. At the end of consolidation, a solid billet of MCPA had been formed and was removed from the consolidation press for testing thereof.

The samples were subjected to X-ray diffraction analysis to determine the crystal structure and relative crystallinity of the polymers therein. The other method utilized to measure relative crystallinity of the polymers in the samples was C-13 solid state Nuclear Magnetic Resonance (NMR).

Figure 3:
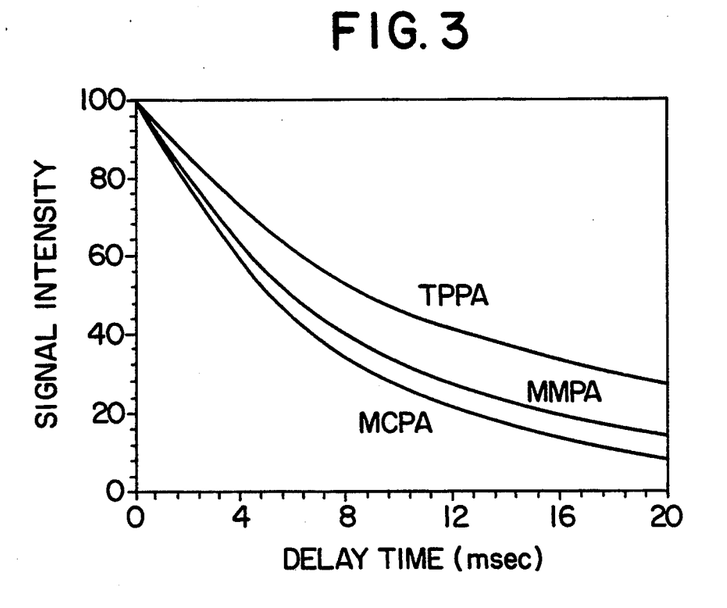
FIG. 3 is a graphical representation of C-13 solid state Nuclear Magnetic Resonance spectrometry results for a polymer alloy polyamide material and a thermally processed polyamide material.

The results of C-13 solid state NMR analysis are illustrated in FIG. 3. As is known, the analytical technique of C-13 solid state NMR is based on inserting a delay time signal after proton-carbon cross polarization to measure the relative crystallinity of polymers. Signals from amorphous materials delay more than those from crystalline materials. Thus, larger remaining signals imply higher crystallinity. As illustrated in FIG. 3, it is clear that the TPPA material has a much higher crystallinity than that of the MMPA and MCPA materials.

Similar results were also obtained in the X-ray diffraction analysis of the two materials, as shown in Table 1. The peak intensities of the TPPA material which reflect the relative crystallinity of the polymer are much higher than those of the MMPA and MCPA materials. Also apparent from the results in Table 1 is the fact that one peak is missing, the other peak is shifted and broadened for the MMPA material when compared to the MCPA and TPPA materials. This means that, when proceeded by mechanical milling, the consolidation technique conducted has resulted in a large alteration of the crystal structure due to special reactions between molecules in the MMPA material.

The results of C-13 solid state NMR and X-ray diffraction analysis indicate that the crystalline structure of the MMPA and MCPA materials differs significantly from that of the TPPA material.

TABLE 1

| MATERIAL | 2T ANGLE | SPACE (D) | INTENSITY |
|---|---|---|---|
| MMPA | 27.192 | 3.8050 | 1780 |
| MCPA | 27.523 | 3.7602 | 1720 |
|  | 23.731 | 4.3500 | 996 |
| TPPA | 27.710 | 3.7353 | 1450 |
|  | 23.569 | 4.3796 | 2111 |

A solid billet of the MMPA material was cut and mounted in thermoset plastic with the longitudinal and transverse surfaces exposed. The exposed surfaces were ground and polished mechanically with a Buehler Ecomet 3 grinder-polisher using the following sequence: 400 grit, 600 grit, 6 μm, 1 μm and finally 0.05 μm. The polished surface was then etched with an etchant comprising concentrated xylene for a period of 4 minutes at 75° C. A solid billet of the TPPA material was polished and etched in a similar fashion.

Figure 4:
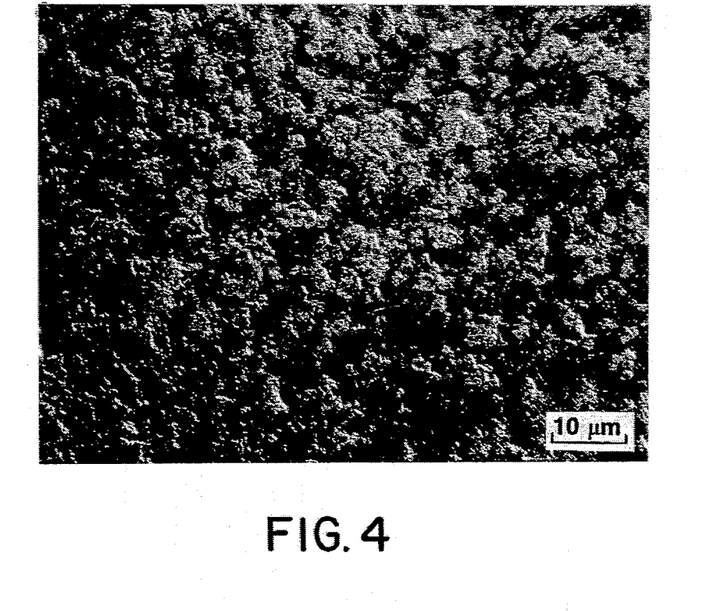
FIG. 4 is an optical micrograph of a polymer alloy polyamide material made using the powdered precursor material of FIG. 1.
Figure 5:
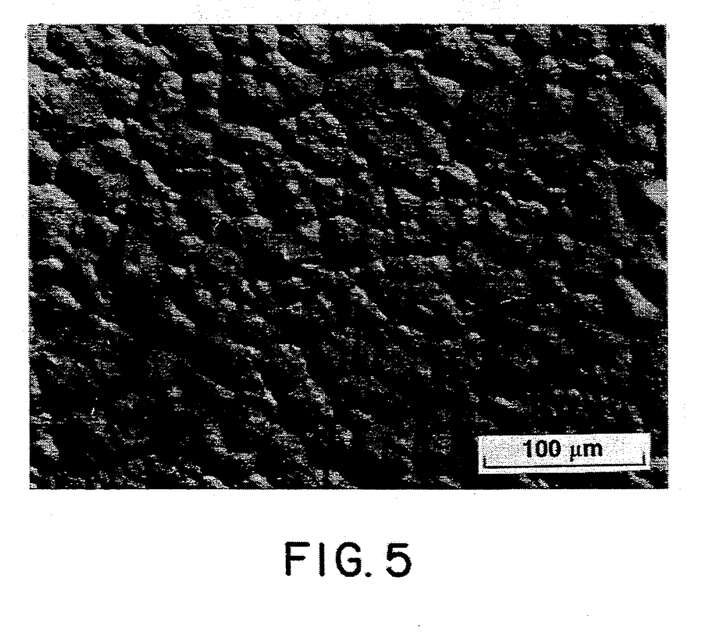
FIG. 5 is an optical micrograph of a thermally processed polyamide material.

Optical micrographs were taken of the polished and etched billets of the MMPA material (FIG. 4) and the TPPA material (FIG. 5). The micrograph for TPPA (illustrated in FIG. 5) compared favourably with the features of similar material published by L. Bartoxiewicz, *J. Polym. Sci., Polym. Physics Edit.*, 12, 1163 (1974) and indicated that the TPPA material had a grain size of approximately 50 μm.

In contrast, as illustrated in FIG. 4, the microstructure of the MMPA material was completely different, having a grain boundary that was not clearly defined and a very small domain size (approximately 3 μm). The reason for the difference in microstructure is not clear at present.

The mechanical properties of the MMPA, MCPA and TPPA materials were then measured and the results are provided in Table 2.

TABLE 2

|  | MMPA | MCPA | TPPA |
|---|---|---|---|
| Hardness (ASTM D785) | 89 ± 1 | 82 ± 1 | 79 ± 1 |
| Ultimate Strength, MPa (ASTM D695-85) | 146.38 ± 0.50 | 104.50 ± 3.17 | 125.35 ± 2.60 |
| Elongation, % (ASTM | 24.9 ± 0.3 | 14.3 ± 0.5 | 34.3 ± 3.0 |

TABLE 2-continued

|  | MMPA | MCPA | TPPA |
|---|---|---|---|
| D695-85) |  |  |  |

As shown in Table 2, significant increases in hardness and ultimate strength are achieved in the MMPA material as compared to the TPPA material.

EXAMPLE 2

The procedure described in Example 1 using the same type of reactor grade polyamide pellets described therein was repeated in this Example.

In this Example, the temperature of consolidation was varied to determine what effect, if any, it had on the properties of the MMPA material. The various consolidation temperatures used were: 100°, 140°, 185°, 233° and 250° C. to produce test billets as follows:

| Sample Number | Consolidation Temperature (°C.) |
|---|---|
| MMPA-1 | 100 |
| MMPA-2 | 140 |
| MMPA-3 | 185 |
| MMPA-4 | 233 |
| MMPA-5 | 250 |

As in Example 1, a portion of the polyamide pellets were thermoformed at 285° C. (melting point of material is 260° C.) using conventional techniques to produce a billet for testing purposes (Thermally Processed PolyAmide: TPPA).

Figure 6:
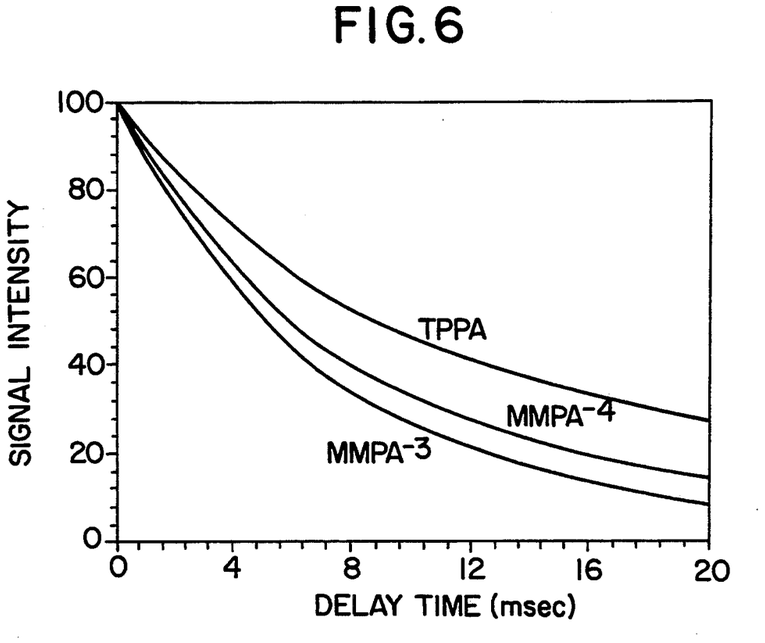
FIG. 6 is a graphical representation of C-13 solid state Nuclear Magnetic Resonance spectrometry results for two polymer alloy polyamide materials and a thermally processed polyamide material.
Figure 7:
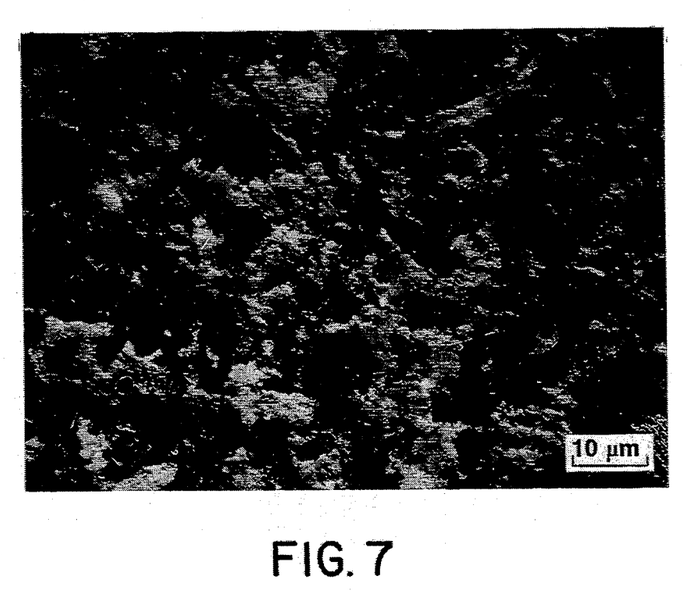
FIGS. 7-10 are optical micrographs of polymer alloy polyamide materials.
Figure 8:
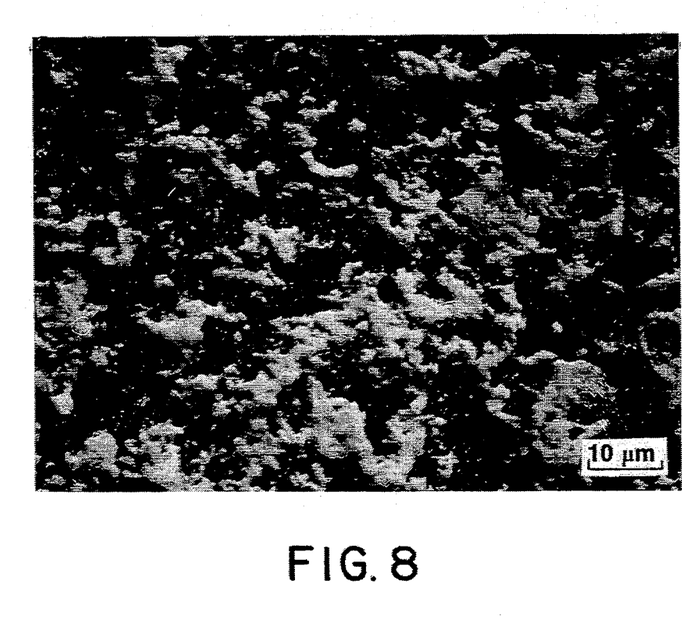
Figure 9:
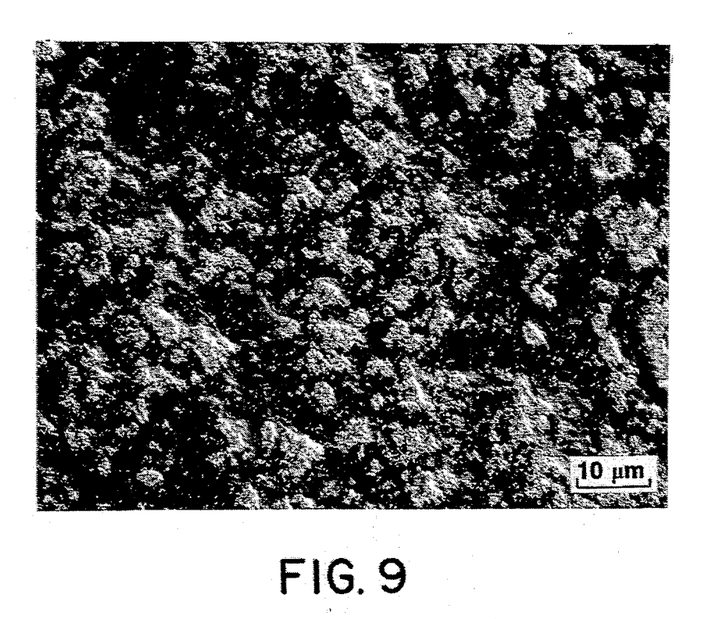
Figure 10:
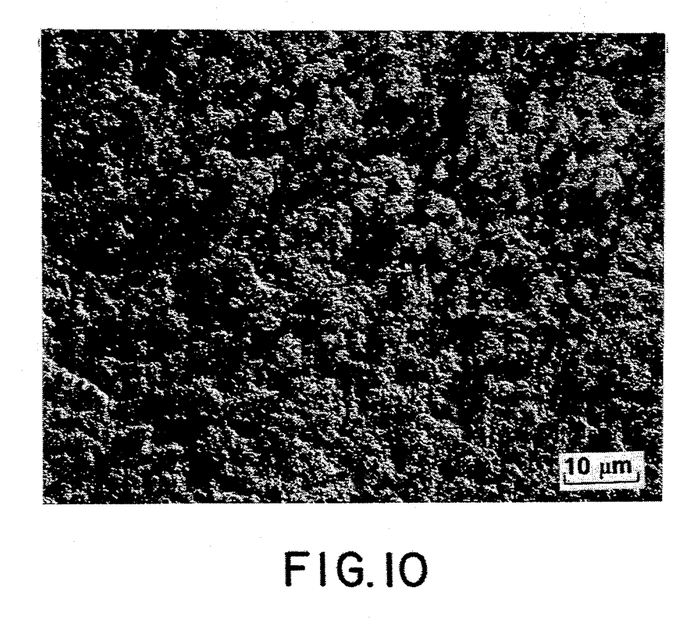

The C-13 solid state NMR spectrometry results are illustrated in FIG. 6 for MMPA-3, MMPA-4 and TPPA. These results confirm that the TPPA material is much more crystalline in nature than either of the MMPA materials.

The results of X-ray diffraction analysis on various of the materials are provided in Table 3. The results shown in Table 3 show that:

1. As consolidation temperature increases, a corresponding increase in crystallinity of the MMPA material occurs as shown by the intensity of the diffracted X-rays.
2. Consolidation temperature has no significant effect on actual nature of the crystal structure as shown by the relatively consistent values for each of 2T angle and space.

TABLE 3

| MATERIAL | 2T ANGLE | SPACE (D) | INTENSITY |
|---|---|---|---|
| MMPA-5 | 27.613 | 3.7481 | 1986 |
| MMPA-4 | 27.192 | 3.8050 | 1780 |
| MMPA-3 | 27.557 | 3.7556 | 1640 |
| MMPA-2 | 27.337 | 3.7795 | 1304 |
| MMPA-1 | 27.035 | 3.8267 | 1164 |
| TPPA | 27.710 | 3.7353 | 1450 |
|  | 23.569 | 4.3796 | 2100 |

The results of hardness tests are found in Table 4 wherein it is apparent that the hardness of the MMPA material increases with the consolidation temperature. It is also apparent that, for each MMPA material tested, a hardness significantly higher than that of the TPPA material is achieved. Accordingly, mechanical alloying of the polyamide has the effect of strengthening the material when compared to thermal processing thereof.

The results of ultimate strength and ductility tests are provided in Table 5 wherein it is apparent that with the increase in consolidated temperature in producing the MMPA material, a relative increase in each of ultimate strength and fracture elongation is achieved. These results support the conclusion that, for optimum processing conditions, mechanical alloying of the polymer has resulted in a strengthened material.

While not wishing to be bound by any particular theory or mode of action it is believed that in the present process of mechanical alloying, the polymers are milled in a manner resulting in extremely fine powders by the mechanism of repeated welding, fracturing and rewelding thereof. After a period of milling, the rates of welding and fracturing substantially equilibrate resulting in very complicated interactions between polymer molecules.

TABLE 4

| MATERIAL | HARDNESS |
|---|---|
| MMPA-5 | 91.5 |
| MMPA-4 | 89 |
| MMPA-3 | 88 |
| MMPA-2 | 86 |
| MMPA-1 | 84 |
| TPPA | 79 |

TABLE 5

| MATERIAL | ULTIMATE STRENGTH (MPa) | ELONGATION (%) |
|---|---|---|
| MMPA-5 | 160.42 | 25.40 |
| MMPA-4 | 146.38 | 24.90 |
| MMPA-3 | 144.50 | 19.20 |
| MMPA-2 | 125.19 | 16.70 |
| MMPA-1 | 109.25 | 13.81 |
| TPPA | 125.35 | 34.30 |

Optical micrographs of various of the MMPA materials were taken after polishing and etching thereof (as described in Example 1), and are illustrated herein as follows:

| Sample Number | Figure |
|---|---|
| MMPA-1 | 7 |
| MMPA-2 | 8 |
| MMPA-3 | 9 |
| MMPA-5 | 10 |

In contrast to micrograph for TPPA (see FIG. 5 in Example 1), the micrographs illustrated in FIGS. 7–10 are completely different and reveal that each of MMPA materials therein have grain boundaries which are not clearly defined. It is apparent that as consolidating temperature is increased, the resulting MMPA material has a more uniform distribution and a smaller defined structure.

EXAMPLE 3

The procedure described in Example 1 using the same type of reactor grade polyamide pellets described therein and, additionally, using XXLP, a high density polyethylene commercially available from E.I. dupont de Nemours & Co., was repeated in this Example. Additionally, a powdered precursor material was prepared based on a 50:50 weight percent mixture of each polymer.

Figure 11:
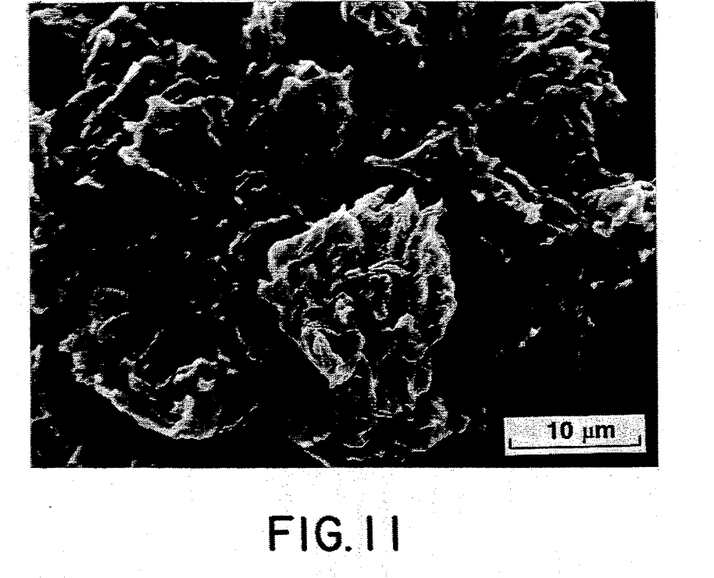
FIGS. 11-12 are electron micrographs of powdered precursor materials.
Figure 12:
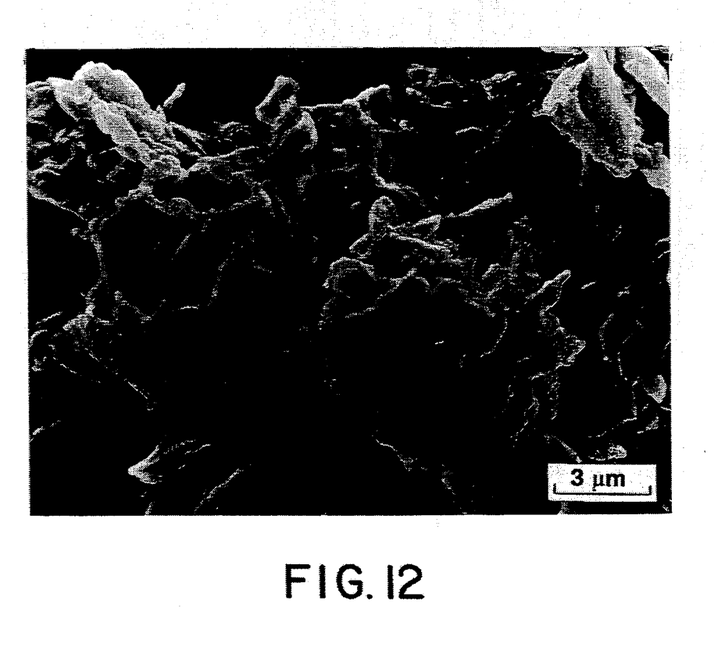

The polymer samples were milled in accordance with the procedure described in Example 1. Morphology studies of the powdered precursor materials were conducted and electron micrographs thereof are provided herein as follows:

| Sample | Figure |
|---|---|
| Polyamide | 1* |
| Polyethylene | 11 |
| Polyamide/polyethylene mixture | 12 |

*from Example 1

These Figures support the conclusion that the polymers have undergone the mechanism of fracture and cold welding known to occur in mechanical alloying processes.

The powder precursor materials had the following approximate average particle sizes:

| Sample | Particle Size |
|---|---|
| Polyamide | 3 μm |
| Polyethylene | 5 μm |
| Polyamide/polyethylene mixture | 3 μm |

These powdered precursors materials would be useful in producing polymer alloy materials in accordance with the present invention.

What is claimed is:

1. A polymer alloy material when produced by the step of:
   consolidating a powdered precursor material consisting essentially of mechanically milled polymer particles having an average particle size less than about 1000 μm at a temperature less than the melting point of the polymer and at a pressure of at least about 5 MPa to thereby produce the polymer alloy material.

2. The polymer alloy material defined in claim 1, wherein the polymer particles have an average particle size in the range of from about 0.5 μm to about 200 μm.

3. The polymer alloy material defined in claim 1, wherein the polymer particles have an average particle size in the range of from about 2 μm to about 50 μm.

4. The polymer alloy material defined in claim 1, wherein the polymer particles have an average particle size in the range of from about 2 μm to about 10 μm.

5. The polymer alloy material defined in claim 2, wherein said polymer particles consist essentially of a single polymer.

6. The polymer alloy material defined in claim 2, wherein said polymer particles consist essentially of a mixture of two or more polymers.

7. The polymer alloy material defined in claim 1, wherein said polymer particles are selected from the group consisting of polycarbonate, poly(methyl methacrylate), poly(amide-imide), polyacryleneketone, poly(acrylonitrile-butadiene-styrene), polyetheretherketone, poly(phenol-formaldehyde), polyphenol, polyester, polacrylate, polyeryl sulfone, poly(etherimide), polyether sulfone, poly(ethylene terephthalate), polyacrylonitrile, polyamide, polystyrene, poly(vinyl chloride), poly(vinyl alcohol), polychlorotrifluoroethylene, epoxy, polycyanate, polymethylpentene, poly(vinyl acetate), poly(vinylidene chloride), poly(vinyl fluoride), polychloroprene, poly(vinylidene fluoride), poly(ethylene oxide), polyoxymethylene, polyisoprene, polyisobutylene, polyethylene, polybutadiene and substituted derivatives thereof.

8. The polymer alloy material defined in claim 1, wherein said polymer particles are selected from the group consisting of EPON, cellulose acetate, nylon 6,6, ionomers, cellulose propionate, nylon 6, polyvinyl butyral, cellulose nitrate, poly(vinyl formate), cellulose acetate butyrate, ethyl cellulose, nylon 11, polyimides, reelamine-phenol resin, reelamine-formaldehyde resin, polymethyl methacrylate, acrylonitrile-butadiene-styrene, polyoxymethylene, nylon 12, poly(aryl ether), polysulfones, polyesters, polycarbonates and substituted derivatives thereof.

9. The polymer alloy material defined in claim 2, wherein said polymer particles consist essentially of polyamide.

10. The polymer alloy material defined in claim 1, wherein the pressure is at least about 10 MPa.

11. The polymer alloy material defined in claim 2, wherein the pressure is at least about 30 MPa.

12. The polymer alloy material defined in claim 1, wherein the pressure is at least about 55 MPa.

13. The polymer alloy material defined in claim 8, wherein the powdered precursor material is subjected to a pretreatment prior to heating thereof, the pretreatment comprising maintaining the powdered precursor material at a temperature of from about 50° to about 100° C. under vacuum for a period of at least about 5 hours.

14. The polymer alloy material defined in claim 2, wherein the powdered precursor material is heated to a temperature defined by the range of from about 25° C. less than the melting point of the polymer up the melting point of the polymer.

15. The polymer alloy material defined in claim 1, wherein the powdered precursor material is heated to a temperature defined by the range of from about 50° C. less than the melting point of the polymer up the melting point of the polymer.

16. A process for producing a polymer alloy material by the steps consisting of:
  mechanically milling a polymer to provide a powdered precursor material consisting essentially of particles having an average particle size less than about 1000 μm; and
  consolidating the powdered precursor material at a temperature less than the melting point of the polymer and at a pressure of at least about 5 MPa to thereby produce the polymer alloy material.

17. The process defined in claim 16, wherein the polymer has an average particle size in the range of from about 0.5 μm to about 200 μm.

18. The process defined in claim 16, wherein the polymer has an average particle size in the range of from about 2 μm to about 50 μm.

19. The process defined in claim 16, wherein the polymer has an average particle size in the range of from about 2 μm to about 10 μm.

20. The process defined in claim 17, wherein said polymer consists essentially of a single polymer.

21. The process defined in claim 17, wherein said polymer consists essentially of a mixture of two or more polymers.

22. The process defined in claim 16, wherein said polymer is selected from the group consisting of group consisting of polycarbonate, poly(methyl methacrylate), poly(amide-imide), polyacryleneketone, poly(acrylonitrile-butadiene-styrene), polyetheretherketone, poly(phenol-formaldehyde), polyphenol, polyester, polacrylate, polyeryl sulfone, poly(ether-imide), polyether sulfone, poly(ethylene terephthalate), polyacrylonitrile, polyamide, polystyrene, poly(vinyl chloride), poly(vinyl alcohol), polychlorotrifluoroethylene, epoxy, polycyanate, polymethylpentene, poly(vinyl acetate), poly(vinylidene chloride), poly(vinyl fluoride), polychloroprene, poly(vinylidene fluoride), poly(ethylene oxide), polyoxymethylene, polyisoprene, polyisobutylene, polyethylene, polybutadiene and substituted derivatives thereof.

23. The process defined in claim 16, wherein said polymer is selected from the group consisting of EPON, cellulose acetate, nylon 6,6, ionomers, cellulose propionate, nylon 6, polyvinyl butyral, cellulose nitrate, poly(vinyl formate), cellulose acetate butyrate, ethyl cellulose, nylon 11, polyimides, melamine-phenol resin, melamine-formaldehyde resin, polymethyl methacrylate, acrylonitrile-butadiene-styrene, polyoxymethylene, nylon 12, poly(aryl ether), polysulfones, polyesters, polycarbonates and substituted derivatives thereof.

24. The process defined in claim 17, wherein said polymer is selected from the group consisting of polyamide, polypropylene and polyethylene.

25. The process defined in claim 16, wherein the pressure is at least about 10 MPa.

26. The process defined in claim 17, wherein the pressure is at least about 30 MPa.

27. The process defined in claim 16, wherein the pressure is at least about 55 MPa.

28. The process defined in claim 23, wherein the powdered precursor material is subjected to a pretreatment prior to heating thereof, the pretreatment comprising maintaining the polymer at a temperature of from about 50° to about 100° C. under vacuum of a period of at least about 5 hours.

29. The process defined in claim 17, wherein the powdered precursor material is heated to a temperature defined by the range of from about 25° C. less than the melting point of the polymer up the melting point of the polymer.

30. The process defined in claim 16, wherein the powdered precursor material is heated to a temperature defined by the range of from about 50° C. less than the melting point of the polymer up the melting point of the polymer.

31. The process defined in claim 17, wherein the polymer is mechanically milled in a ball mill.

32. The process defined in claim 17, wherein the polymer is mechanically milled in a ball mill capable of providing an overall acceleration of at least about 10 g's.

33. The process defined in claim 32, wherein the polymer is mechanically milled in a ball mill comprising a mill chamber which is cooled to a temperature below the glass transition temperature of the polymer.

34. The process defined in claim 16, wherein mechanically milling of the polymer comprises freezing the polymer to produce a frozen polymer and thereafter crushing the frozen polymer to produce the powdered precursor material.

* * * * *